United States Patent [19]
Ward et al.

[11] Patent Number: 4,562,304
[45] Date of Patent: Dec. 31, 1985

[54] APPARATUS AND METHOD FOR EMULATING COMPUTER KEYBOARD INPUT WITH A HANDPRINT TERMINAL

[75] Inventors: Jean R. Ward, Arlington; Andrew H. Nilssen, Needham, both of Mass.

[73] Assignee: Pencept, Inc., Waltham, Mass.

[21] Appl. No.: 613,099

[22] Filed: May 23, 1984

[51] Int. Cl.⁴ .............................................. G06K 9/10
[52] U.S. Cl. ......................................... 178/18; 382/13
[58] Field of Search ....................... 178/18, 19; 382/13

[56] References Cited

U.S. PATENT DOCUMENTS

| | | | |
|---|---|---|---|
| 3,112,362 | 2/1983 | Blesser | 364/724 |
| 3,399,401 | 8/1968 | Ellis et al. | 340/324 |
| 3,487,371 | 12/1969 | Frank | 340/172.5 |
| 3,500,323 | 12/1965 | Funk et al. | 340/146.3 |
| 3,705,956 | 1/1971 | Dertouzos | 178/18 |
| 3,909,785 | 9/1975 | Howells | 382/13 |
| 3,979,722 | 9/1976 | Sakoe | 340/146.3 |
| 3,999,012 | 12/1976 | Dym | 340/347 |
| 4,375,081 | 11/1963 | Pecker et al. | 178/18 |

Primary Examiner—Stafford D. Schreyer
Attorney, Agent, or Firm—Dike, Bronstein, Roberts, Cushman & Pfund

[57] ABSTRACT

An apparatus and method are disclosed for emulating computer keyboard input from a handprint terminal, the output of the handprint terminal comprising character data along with row and column position data for each character. A line buffer memory temporarily holds characters from the same row. While the characters belonging to any given row are stored in the line buffer memory, local editing may be performed to delete and/or add and/or change characters, with function signals being outputted from the apparatus by the control unit equivalent to function signals that would be outputted from a keyboard. When a character received is in a different row from the character preceeding it, the line buffer memory is cleared of all previous characters that had been loaded into it and carriage return or carriage-up signals are outputted from the control unit corresponding to the row change. The character is then loaded into the line buffer memory to start a new row.

14 Claims, 2 Drawing Figures

APPARATUS AND METHOD FOR EMULATING COMPUTER KEYBOARD INPUT WITH A HANDPRINT TERMINAL

BACKGROUND OF THE INVENTION

The present invention relates generally to handprint terminals and more particularly to an apparatus for emulating computer keyboard input from a handprint terminal.

Handprint terminals are known in the art. These terminals generally include a digitizing tablet which converts movement of a stylus on a sheet of paper as characters are printed thereon into data signals and a handprint character recognition device which recognizes the characters represented by the data signals produced by the digitizing tablet and outputs handprint data. The handprint data comprises data corresponding to the particular character along with data corresponding to the row and column position of each character. In most handprint terminals, the output data is in the form of a serial stream with the row and column position for a character following the data for the character itself.

Handprint terminals may be used as input devices for communicating with a computer and are especially useful in entering text.

One of the problems, however, associated with using a handprint terminal as an input device to a computer is that most computers are programmed to enter data received from a computer keyboard and are not programmed to enter the type of data emitted from a handprint terminal. As is known, the output from a computer keyboard is a serial stream of data corresponding to characters and/or functions, the order in which the character keys and/or function keys being depressed by the typist determining the order in which the corresponding data signals are sent to the computer. The data does not contain positional information. On the other hand, in a handprint terminal characters may be printed at any location on the digitizing tablet and the handprint data emitted will be in the order in which the characters are typed and will contain the character data and also the row and column positional data for each character.

Accordingly, the need exists for an apparatus for converting data from a handprint terminal to form equivalent to that of data outputted from a computer keyboard. Such an apparatus would enable a handprint terminal to be used as an input device to any computer programmed to accept typewritten data without having to make any software or hardware changes in the computer.

An example of a handprint terminal is described in U.S. Pat. No. 4,375,081 to B. Blesser. Other references of interest include U.S. Pat. No. 3,112,362 to E. A. Pecker et al; U.S. Pat. No. 3,399,401 to T. O. Ellis et al; U.S. Pat. No. 3,487,371 to A. J. Frank: U.S. Pat. No. 3,500,323 to H. L. Funk et al; U.S. Pat. No. 3,705,956 to M. L. Dertouzos; U. S. Pat. No. 3,979,722 to H. Sakoe; and U.S. Pat. No. 3,999,012 to H. Dym.

It is an object of this invention to provide an apparatus and method for emulating computer keyboard input from a handprint terminal.

It is another object of this invention to provide an apparatus and method for converting handprint data from a handprint terminal to a form suitable for entry into a computer that is programmed to enter typewritten data from a computer keyboard.

It is further object of this invention to provide a method and apparatus as described above which enables editing of the handprint data at the line level.

SUMMARY OF THE INVENTION

An apparatus for emulating computer keyboard input with a handprint terminal contructed according to the teachings of the present invention includes a control unit, a line buffer memory for holding a row of characters, means for determining the row and column position of each character received from the handprint terminal relative to the row and column position of each character preceeding it, means for loading the characters as they are received from the handprint terminal into said line buffer memory according to their relative column position, a row at a time, on instructions from said control unit, and means for sequentially reading out the contents of the line buffer memory.

A method for emulating computer keyboard input with a handprint terminal according to the present invention comprises determining the row and column position of each character received from the handprint terminal relative to the row and column position of the character preceeding it, loading each cell location in a line buffer memory initially with a space character, loading each character received from the handprint terminal into the line buffer memory at a cell location according to its column position, clearing the line buffer memory of all characters previously loaded therein from said handprint terminal if the row position of a character to be loaded is different from the row position of the character preceeding it, outputting appropriate signals indicating row changes and reading out sequentially the contents of the line buffer memory.

Various features and advantages will appear from the description to follow. In the description, reference is made to the accompanyng drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limited sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENTS

The present invention is directed to an apparatus and method for emulating computer keyboard input from a handprint terminal which is being used to enter text into a computer that is programmed to enter typewritten data from a computer keyboard as it is being typed. The present invention accomplishes this by first separating the character data from its associated column and row position data. Each character received from the handprint terminal, if it is in the same row as the character preceeding it, is loaded into the line buffer memory at a cell location according to its column position relative to the character preceeding it. At the same time the contents of the line buffer memory are read out sequentially, a cell at a time starting with the first cell location. While the characters are stored in the line buffer memory, local editing may be performed, as needed, to delete, change or add characters. When a character received is in a row different from the row of the previous characters, the line buffer memory is cleared of all previous characters that have been loaded into it and the procedure repeated for a new row.

The arrangement for loading the characters of the same row into the line buffer memory at cell lcoations according to their column position includes determining the difference (if any) in the row and column position of each character relative to the row and column position of the character preceeding it. This is achieved using difference calculators, comparators and counters along with registers for holding row and column numbers of the current character to be entered and the previous character. The difference information includes the magnitude as well as as the direction of the difference.

The invention enables a handprint terminal to be used as an input device to a computer programmed to accept typewritten data without having to make any hardware or software changes in the computer itself.

Figure 1:
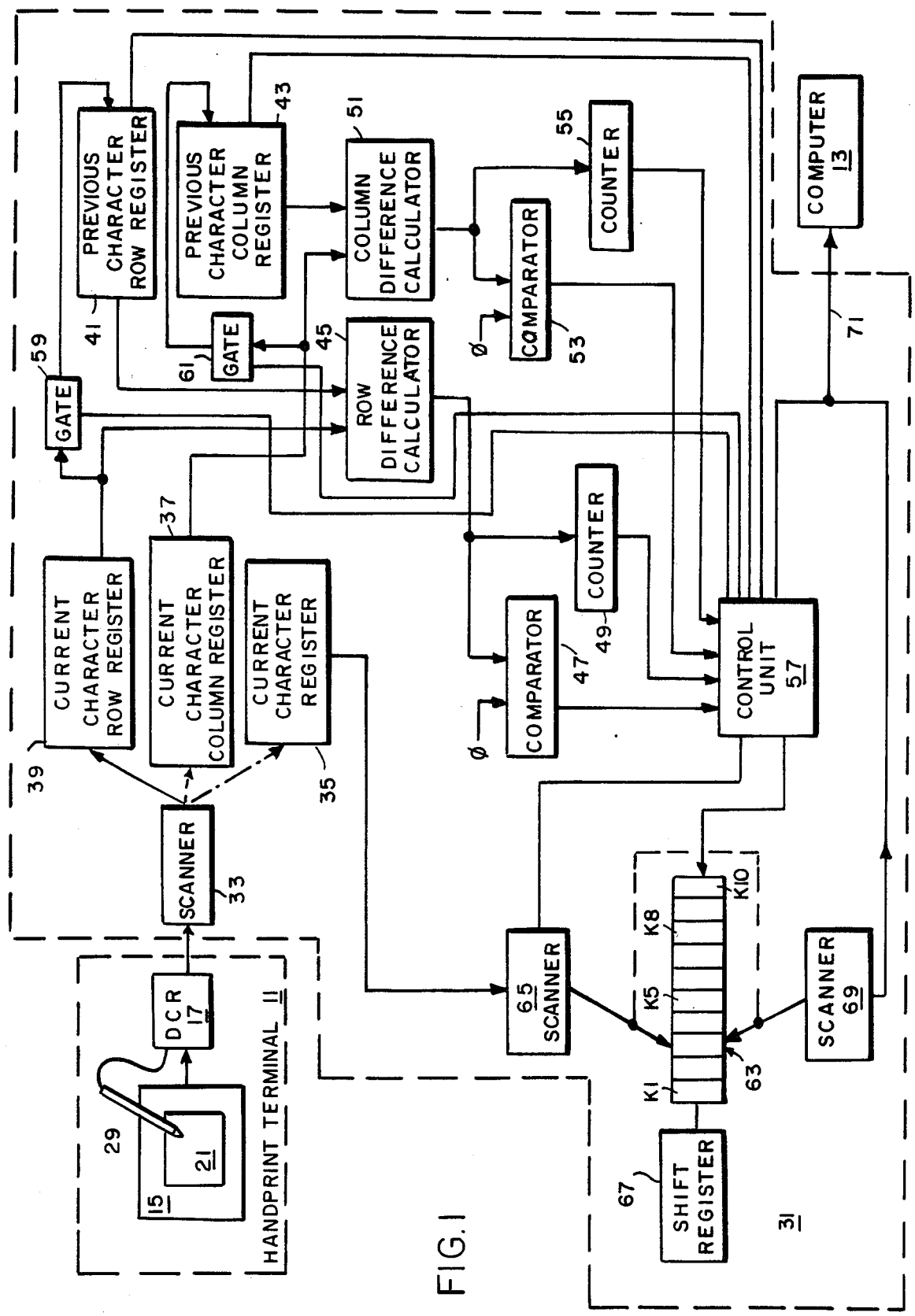
FIG. 1 is a block diagram of an apparatus constructed according to the teachings of the present invention for emulating computer keyboard input with a handprint terminal, the apparatus shown as being coupled between a handprint terminal and a computer.

Referring now to the drawings, there is shown in FIG. 1 a handprint terminal identified by reference numeral 11 and a computer identified by reference numeral 13.

Computer 13 is programmed to receive typewritten data from a computer keyboard (not shown).

Handprint terminal 11 includes a digitizing tablet 15 and a handprint data character recognition device 17. Digitizing tablet 15 includes a top surface 19 on which is positioned a sheet 21 of paper or other suitable material. Sheet 21, which is shown in more detail in FIG. 2, contains a plurality of horizontal lines 23 and vertical lines 25 which together form rectangular blocks or boxes 27 aligned in horizontal rows and vertical columns. The number of rows is preferably equal to the number of characters that the computer 13 is programmed to comprise a line of text. In the exemplary embodiment, there are ten vertical columns labelled from left to right 1 through 10 and ten horizontal rows labelled from top to bottom 1 through 10 which together provide a grid of 100 boxes. Handprint data character recognition device 17 converts data signal corresponding to positions of a stylus on sheet 21 ASC11 code signals of characters.

Handprint terminal 11 is used in a conventional manner. Text is printed on the sheet 21 by hand, each character being printed in one of the boxes 27. The position of a stylus 29 as it is moved over sheet 21 in forming the characters is converted by the digitizing tablet 15 into data signals corresponding to its X and Y coordinates. The data signals are sent to handprint dynamic character recognition device 17. Handprint dynamic character recognition device 17 processes the data signals to recognize the characters printed by the writer and outputs a stream of handprint data. The handprint data includes data corresponding to the particular character printed along with data relating to the row and column position of each character. In the embodiment shown, the row and column position data for each character is immediately following the data corresponding to character itself. The characters need not be printed on sheet 21 in any order.

Also shown in FIG. 1 is an apparatus 31 constructed according to the teachings of the present invention for converting the handprint data from handprint terminal 11 into a form suitable for entry into computer 13 and also for enabling the text so printed to be edited at the line level in the same manner as typewritten text on a computer keyboard is edited. Apparatus 31 is coupled between handprint terminal 11 and computer 13.

As noted before, the output from a computer keyboard is a serial stream of data representing characters (or functions) with no positional data, the order in which the keys in the keyboard being depressed determining the order in which the data is entered into the computer 31.

Apparatus 31 includes a first scanner 33, a current character register 35, a current column register 37 and a current row register 39. Scanner 31 takes the handprint data from handprint terminal 11 for each character as it is received and loads the character (data) into current character register 35, the column (position data) for that character into current column register 37 and the row (position data) for that character into current row register 39. For example, if the character A is written on sheet 21 in column 2, row 5, the ASC11 code for the letter A will be loaded into current character register 35, the ASC11 code for 2 will be loaded into current column register 37 and the ASC11 code for 5 will be loaded into current row register 39. If the character data, column data and row data are outputted from handprint terminal of along separate paths rather than a single path then scanner 33 is not needed.

Apparatus 31 further includes a previous character row register 41, a previous character column register 43, a row counter 49, a column difference calculator 51, a column comparator 53 and a column counter 55, a control unit 57 and a pair of gates 59 and 61.

Previous character row register 41 is used to hold the row number of the character stored previously in current row register 39. Previous character column register 43 is used to hold the column number of the character stored previously in current column register 37. Previous character row register 41 and previous character column register 43 are initially loaded with a "special" number that will never occur. The number may be for example a minus one. Row difference calculator 45 calculates the difference between the row number in current row register 39 and the row number in previous character row register 41 and outputs a signal representative of the difference. However, if the "special" number is in previous row register 41, row difference calculator will output a zero. Comparator 47, which is a tri-state comparator, compares the output difference signal from row difference calculator 45 to 0 and outputs a zero if they compare, a plus one signal if the output of calculator 45 is positive and a minus one signal if the output of calculator 45 is negative. Counter 49 counts the number of pulses in the difference signal (if any) from difference calculator 45 and outputs a signal correspondng to the count. The output signals from tri-state comparator 47 and counter 49 are fed into control unit 57. Column difference calculator 51 calculates the difference between the column number in current column register 37 and the column number in previous column register 43 and outputs a signal representative of the difference. If however, the "special" number is loaded into previous character column register 43 then column difference calculator will output a zero. Comparator 53 which is also a tri-state comparator, compares the output signal from column difference calculator 5 to 0 and outputs an appropriate signal. Counter 55 counts the number of pulses in the difference signal (if any) from difference calculator 51. The output signals from tri-state comparator 53 and counter 55 are fed into control unit 55. Control unit 55 controls the overall operations of apparatus 29 and in addition sends function and/or control signals to computer 31 as will hereinafter be described. Control unit 55 may be a microprocessor. Gate 51 enables or disables the flow of the row data from current character row register 39 into previous character row register 41. Gate 61 enables or disables the flow of the data from current character column register 37 to previous character column register 43.

Apparatus 31 further includes a line buffer memory 63, a second scanner 65, a shift register 67 and a third scanner 69.

Line buffer memory 63 contains a row of memory cells. The number of memory cells in line buffer memory 63 is equal to the number of characters programmed by computer 31 to constitute a row. Thus, line buffer memory 63 is shown as having ten memory cells labelled from left to right K1 through K10. Line buffer memory 63 is used for temporary storage characters in the same row according to their column position and to enable local editing of the characters so stored as will hereinafter be explained. Second scanner 65 loads characters from current character register 35 into buffer memory 57 at cell locations according to instructions from control unit 55. Shift register 61 shifts the characters loaded into line buffer memory 63 one or more cell locations to the right on instructions from control unit 57. Third scanner 69 is ganged to second scanner 65 and is used to read the characters in the memory cells in line buffer memory 63 sequentially when it is moved from left to right but not from right to left and sends the characters so read to computer 13 over line 71 on instructions from control unit 57. Each cell in line buffer memory is loaded initially with "space" characters.

Apparatus 31 is used in the following manner. First, scanners 65 and 69 are positioned at first memory cell K1 in line buffer memory 63. Then, a "space" character (i.e. the ASC11 code equivalent of a space character) is loaded into each one of the memory cells in line buffer memory 63 from control unit 57 and the special number (i.e. the minus one) is loaded into previous character row register 41 and previous character column register 43 from control unit 57. Then gates 59 and 61 are closed. Apparatus 31 is then ready to receive handprint data from handprint terminal 11.

Figure 2:
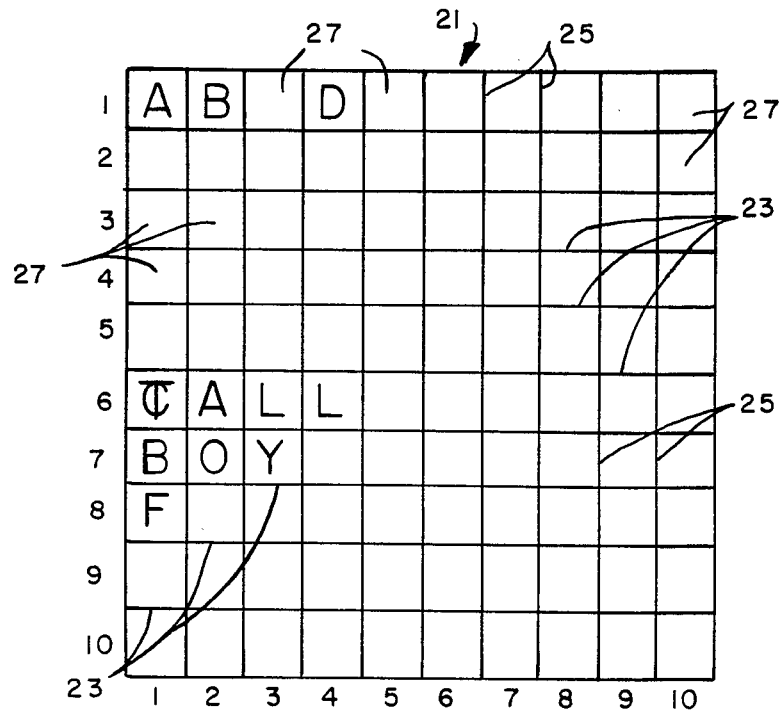
FIG. 2 is an enlarged view of the sheet of paper in the handprint terminal shown in FIG. 1.

Assume the first character printed by the user is the letter A and the character is printed on sheet 21 in the box in column 1, row 1 as shown in FIG. 2.

The handprint data is received by first scanner 33. The character A is loaded by first scanner 33 into current character register 35, the column number (data) is loaded by first scanner 33 into current character volumn register 37 and the row number (data), loaded by first scanner 33 into current row register 39.

The difference between the numbers in current character column register 37 and previous character column register 43 are calculated by column difference calculator 51. Since this is the first character received, the number in previous character column register is still the special number (i.e. the minus one). As noted before, column difference calculator 51 is designed to output a zero when the special character is in previous character column register 43. The zero output causes the outputs of comparator 53 and counter 55 to each emit zero signals to control unit 57. The difference between the numbers in current character row register 39 and previous character row register 41 is processed in a similar manner through row difference calculator 45, comparator 47 and counter 49 producing zero signals that are sent to control unit 57. Control unit 57 then instructs scanner 65 to read the character A in current character register 35 and unload the character A so read into cell K1 in line buffer memory 63. After the character A is loaded in cell K1 control unit 57 instructs scanner 69 to read the contents of cell K1 and send the contents to computer 13. Gates 59 and 61 are then opened to allow the data from current character row register 39 (i.e. the number one) to be loaded into previous character row register 41 and the data from current character column register 37 (i.e. the number one) to be loaded into previous character column register 43. Gates 59 and 61 are then closed.

Apparatus 31 is then ready to receive the next character and its associated row and column numbers from handprint terminal 11.

Assume the next character printed is the letter B, and the letter is printed on sheet 21 in column 2, row 1 (see FIG. 2).

The letter B is loaded into current character register 35. The number 2 corresponding to column 2 is loaded into current character column register 37 and the number one corresponding to row one is loaded into current character row register 39. The difference signal from row difference calculator 45 will be zero since registers 39 and 41 each contain a one. This produces a compare or zero signal from comparator 47 and a zero count signal from counter 49. Both signals are fed into control unit 57. On the other hand, column difference calculator 51 will generate a plus one signal since the column number in current character column register 37 is one greater than the column number in previous character column register 43. This will produce a plus output from comparator 53 and a one count from counter 55. Both signals are fed into control unit 57.

The zero signals from comparator 47 and 49 mean that the letter B is in the same row as the letter A while the plus and one count signal from comparator 53 and counter 55, respectively, indicate that the letter B is one column to the right of the letter A. Accordingly, control unit 57 will send out a signal instructing scanner 65 to move one cell location to the right to cell K2, read the character in current character register 35 and unload the character to read into memory cell K2. Since scanner 69 is ganged to scanner 65 it will also move to cell K2. As soon as the character is loaded into cell K2, the contents of cell K2 are read out by scanner 69 and fed to computer 13. Gates 59 and 61 are then opened to allow the contents of registers 37 and 39 to be loaded into registers 41 and 43, respectively. Gates 59 and 61 are then closed again.

Assume the next character printed is the letter D, and the letter is printed on sheet 21 in row one, column four. This may occur for example, if the next letter is the start of a new word. The outputs from comparator 47 and counter 49 will both be zero since the character is in the same row as the previous character. Calculator 51 will output a plus two signal since the character in register 37 is two columns to the right of the character in register 43. The output from comparator 53 will be a plus one since the character is to the right of the previous character. The output from counter 55 will be a two count since the character is two columns from the previous character rather than simply in the next column. Control unit 57 will then move scanner 65 and 69 two memory cells to the right to memory cell K4. When scanner 65 and 69 pass memory cell K3 the contents will be read out by scanner 69. Since scanner 65 has not loaded any data into memory cell K3 the data read out by scanner 69 will be the "space" character previously loaded in by control unit 57. Once scanner 65 is positioned at memory cell K4 the contents of current character register 35 (i.e. the character D) are read by scanner 65 and loaded into that memory cell. As soon as the character D is loaded into memory cell K4 the contents of memory cell K4 are read out by scanner 69.

The same procedure is repeated for each subsequent character that is in the same row as the previous character.

While the characters for any row are loaded in line buffer memory 63, local editing may be performed as follows.

Assume the first word printed is the word TALL and the letters are printed on sheet 21 in order in row 6, column 1, 2, 3 and 4. The characters will be loaded into memory cells K1, K2, K3 and K4 and after each character is loaded in it will be read out by scanner 69 and sent to computer 13.

Now, assume after the word TALL has been printed, the writer wishes to change the word to CALL. This is accomplished by printing the letter C over the letter T on the sheet 21. The letter C will be fed into current character register 35. The outputs of comparators 47 and 49 will still be zero since the character to be entered is still in the same row. Column difference calculator 51 will output a negative three since the character is three column positions to the left of the previous character received (i.e. the second L in TALL). This will produce a negative signal from comparator 53 and a three count from counter 55. Control unit 57 will then move scanners 65 and 69 three cells to the left. For each cell to the left that the scanners are moved, control unit 57 will output a delete signal to computer 13. Scanner 69 will not read out the contents of each cell passed since it only reads the contents of cells when it is moving in a forwardly direction. Once scanners 65 and 69 are at cell K2 the new character will be loaded in by scanner 65 and then read out by scanner 69. The apparatus is then ready to receive the next character. As scanner 69 moves to the right it will read out the contents of each cell. This time the characters sent out will be of the word BALL.

Characters may be deleted (i.e. erased) by printing over the character on sheet 21 that is to be deleted a character that will recognized by the handprint data character recognition unit 17 as a "space". For example, handprint data character recognition unit 17 may be arranged to output the ASC11 code for a "space" when it receives an inverted "U" pattern (i.e    ). The processing that follows is identical to that described above for changing a character. When the procedure is complete, the memory cell containing the character that has been deleted will not contain the ASC11 code of the character to be deleted but rather will contain the ASC11 code for a space.

As can be appreciated, the first character printed by the user will always be loaded into cell K1 regardless of what column it is actually located in on paper 21. Thus, even though the writer may print the first letter in column three, it will be loaded into cell K1. Accordingly, assume after the word ALL is printed in columns two, three and four, the writer wishes to change ALL to TALL and prints the letter T in front of the letter A in column one. The characters for the word ALL will be initially in cells K1, K2 and K3. Control unit 57 will receive a negative signal from comparator 53 instructing it to move scanners 65 and 69 to the left and a four from counter 55 telling it to move the four cells to the left. In this instance the following will occur. Scanner 65 and 69 three cells to the left, back to cell K1. Control unit 57 will output three delete signal to computer 23. Since scanners 65 and 69 are at the first memory cell but must move one column position further to the left, control unit 57 will instruct shift register 67 to shift the contents of cells K1, K2, K3 one cell location to the right to cells K2, K3 and K4. Scannner 65 will then load the new character T into cell K1 and scanner 69 will read out the contents of cells K1, K2, K3 and K4.

Row changes are processed as follows.

Assume after printing the word BOY in row seven, columns one, two and three the user prints the letter F in row eight, column one. A plus one will be sent out from row difference calculator 45 since the row of the current character F is one greater than the row of the previous character Y. This will produce a plus signal from comparator 47 and a one count from counter 49. Comparators 53 and 55 will output a negative signal and a two count from comparators 53 and 55, respectively. On receiving the plus signal from comparator 47, control unit 57 will clear line buffer memory 63 by loading a "space" character data signal into each cell. On receiving the one count from counter 49, control unit 57 will output a "carriage return" data signal over line 71 to computer 13 equal to the "carriage return" signal from a computer keyboard. On receiving the negative and two count signals from comparators 53 and counter 55, respectively, control unit 57 will move scanner two cell positons to the left to cell K1. Once repositioned, scanner 65 will read out the character F from register 35 and load it into cell K1. Scanner 69 will then read out the contents of cell K1.

If a character is printed in a row two rows below the previous character, counter 49 will output a two count and control unit 57 will output two carriage return signals. If a character is printed in a row above a previous character comparator will output a negative signal causing control unit to output a "carriage-up" signal rather than a "carriage-return" signal. If the new character is more than one row above the previous character counter 49 will provide the number count for indicating how many "carriage-return signals" should be emitted.

Once a row of characters has been cleared from line buffer memory 63, editing changes are not possible.

As noted above, the first character printed will always be loaded into cell K1 and will always be fed into computer 13 as the first character in a line. However, by printing characters on the sheet 21 that will be interpreted by data character recognition device 17 as "space" characters, the location of the first character of the first word to be printed on the line can be placed at any column position desired. This procedure may be used if, for example, the writer wishes to indent characters one or more column positions to indicate the start of a new paragraph.

As can be appreciated, line buffer memory 63 serves to functions, namely, (1) it enables the charcters in a row to be positioned according to their column position and (2) it enables local editing to be performed at the line level.

The embodiment of the present invention is intended to be merely exemplary and those skilled in the art shall be able to make numberous variations and modifications to it without departing from the spirit of the present invention. All such variations and modifications are intended to be within the scope of the present invention as defined in the appended claims.

What is claimed is:

1. Apparatus for emulating computer keyboard input from output of a handprint terminal, the output comprising data corresponding to each character along with row and column position data for each character, said apparatus comprising:
   a. a control unit
   b. means for receiving the output of the handprint terminal and separating the character data, row position data and column position data for each character into separate signal paths,
   c. a line buffer memory having a row of memory cells for temporary storage of characters in the same row,
   d. means for comparing the row and column position of each character with the row and column position of the character immediately preceeding it and transmitting signals indicative of the comparison thereof to said control unit.
   e. means responsive to signals from said control unit for loading the characters as they are received into the line buffer memory at memory cell locations according to their column positions, a row at a time, and
   f. means for sequentially reading out the characters stored in the memory cells in the line buffer memory.

2. The apparatus of claim 1 and further including shift register means coupled to said buffer memory for shifting the characters in said memory one or more cell locations to the right on instructions from said control unit.

3. The apparatus of claim 1 and wherein the means for comparing the row and column position of each character with the row and column position of each character immediately preceeding it comprises a row difference calculator for calculating the difference in row position between the row of each character with the row of the character preceeding it and outputting a signal corresponding to said difference in row position, a row comparator for comparing the signal from the row difference calculator to a fixed value, a row difference counter for outputting a signal representing the count of said difference in row position, a column difference calculator for calculating the difference in column position between the column position of each character with the column position of the character preceeding it and outputting a signal corresponding to said difference in column position, a column comparator for comparing the signal from the column difference calculator to a fixed value and a column difference counter for outputting a signal representing the count of said difference in column position.

4. The apparatus of claim 3 and further including a current character register for holding a current character, a current column register for holding the column number of the character in the current character register, a current row register for holding the row number of the character in the current character register, a previous column register for holding the column number of the previous character and a previous row register for holding the row number of the previous character.

5. The apparatus of claim 4 and wherein the control unit comprises a microprocessor.

6. The apparatus of claim 5 and wherein the means for separating the character data, row data and column data comprises a first scanner.

7. The apparatus of claim 5 and wherein the means for loading characters into the line buffer memory comprises a second scanner.

8. A method for emulating computer keyboard input from output of a handprint terminal, the output comprising character data along with row and column position data for each character, the method comprising:
   a. loading each character as it is received from the handprint terminal into a different cell in a line buffer memory according to its column position a row at a time, and
   b. reading out the data stored in each cell in said buffer memory in sequence.

9. The method of claim 8 and further including editing the data stored in the line buffer memory, as required.

10. The method of claim 9 and wherein editing comprises deleting characters.

11. The method of claim 9 and wherein editing comprises shifting characters to the right.

12. The method of claim 8 and further including clearing the characters stored in said line buffer memory if a character to be loaded into said line buffer memory is in a row different from the row of the characters currently loaded therein.

13. Apparatus for converting a handprint data into a form suitable for entry into a computer that is programmed to accept typewritten data from a computer keyboard as it is typed, the handprint data comprising character data along with row and column position data for each character, said apparatus comprising:
   a. a current character register for holding a current character,
   b. a current row register for holding the row of the current character,
   c. a current column register for holding the column of the current character,
   d. means for loading the character, row and column data of a current character into its respective current register,
   e. a previous row register for holding the row of the previous character,
   f. a previous column register for holding the column of the previous character,
   g. a control unit,
   h. means for processing the data in the current and previous row registers and transmitting signals indicative of their difference to the control unit,
   i. means for processing the data in the current and previous registers and transmitting signals indicative of their difference to the control unit,
   j. a line buffer memory for holding a row of characters, k. a second scanner responsive to signals from said control unit for loading characters from said current character register into said line buffer memory according to their column position a row at a time, and l. a third scanner for reading out data stored in said buffer memory.

14. A computer system comprising:

a. a handprint terminal for outputting handprint data, said handprint data comprising characters and row and column position for each character, b. a computer programmed to accept typewritten data from a computer keyboard, and c. an apparatus coupled between said handprint terminal and said computer for converting the output of the handprint terminal to a form acceptable by said computer, said apparatus comprising:

i. a control unit, ii. means for separating the character data, row position data and column position data into separate signal paths, iii. a line buffer memory having a row of memory cells for temporary storage of a row of character data.

iv. means for comparing the row and column position of each character with the row and column position the character immediately preceeding it as it is received from the handprint terminal and transmitting signals indicative of the comparison thereof to said control unit, v. means responsive to signals from said control unit for loading the characters into said line buffer memory, one character at a time, according to their column position a row at a time, and vi. means for sequentially reading out the data stored in said line buffer memory.

* * * * *